United States Patent
Schmalstieg et al.

(10) Patent No.: US 11,875,452 B2
(45) Date of Patent: Jan. 16, 2024

(54) BILLBOARD LAYERS IN OBJECT-SPACE RENDERING

(71) Applicant: QUALCOMM Technologies, Inc, San Diego, CA (US)

(72) Inventors: Dieter Schmalstieg, Graz (AT); Markus Steinberger, Graz (AT); Wolfgang Tatzgern, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/400,031

(22) Filed: Aug. 11, 2021

(65) Prior Publication Data
US 2022/0058860 A1 Feb. 24, 2022

Related U.S. Application Data

(60) Provisional application No. 63/067,050, filed on Aug. 18, 2020.

(51) Int. Cl.
*G06T 15/20* (2011.01)
*G06T 3/00* (2006.01)

(52) U.S. Cl.
CPC .......... *G06T 15/205* (2013.01); *G06T 3/0031* (2013.01); *G06T 2210/36* (2013.01); *G06T 2210/62* (2013.01)

(58) Field of Classification Search
CPC . G06T 15/205; G06T 3/0031; G06T 2210/36; G06T 2210/62; G06T 1/20; G06T 15/503; G06T 19/00
See application file for complete search history.

(56) References Cited

U.S. PATENT DOCUMENTS

| | | | |
|---|---|---|---|
| 2008/0174311 A1 | 7/2008 | McGraw | |
| 2013/0321593 A1* | 12/2013 | Kirk | ........................ G06T 15/04 348/51 |
| 2017/0239573 A1 | 8/2017 | Shimizu et al. | |

OTHER PUBLICATIONS

Akenine-Moller, Thomas and Eric Haines. "Real-Time Rendering." 2nd ed. (2002), pp. 118-122 and 318-323. (Year: 2002).*

(Continued)

*Primary Examiner* — Daniel F Hajnik
(74) *Attorney, Agent, or Firm* — Procopio, Cory, Hargreaves & Savitch LLP

(57) ABSTRACT

The present disclosure relates to methods and apparatus for graphics processing. The apparatus may configure a plurality of billboards associated with a viewpoint of a first frame of a plurality of frames, the plurality of billboards being configured in one or more layers at least partially around the viewpoint, the configuration of the plurality of billboards being based on one or more volumetric elements between at least one of the plurality of billboards and the viewpoint. The apparatus may also render an image associated with each of the one or more volumetric elements between at least one billboard of the plurality of billboards and the viewpoint, the rendered image including a set of pixels. The apparatus may also store data in the at least one billboard based on the rendered image associated with each of the one or more volumetric elements, the data corresponding to the set of pixels.

29 Claims, 10 Drawing Sheets

(56) References Cited

OTHER PUBLICATIONS

Bao G., et al., "Large-Scale Forest Rendering: Real-time, Realistic, and progressive", Computers and Graphics, Elsevier, GB, vol. 36, No. 3, Jan. 11, 2012 (Jan. 11, 2012), pp. 140-151, XP028470678, 12 Pages, ISSN: 0097-8493, DOI: 10.1016/J.CAG.2012.01.005 [Retrieved on Feb. 1, 2012) Figure 3 chapter: 2. "Related work"; p. 141-p. 43.
Davis A., "Dynamic 2D Imposters: A Simple Efficient Directx 9 Implementation", Internet Citation, Jan. 5, 2006 (Jan. 5, 2006), XP001543425, 9 Pages, Retrieved from the Internet: URL: http://www.gamasutra.com/features/20060105/davis_01.shtml. [Retrieved on Jan. 1, 1900], Figures 1-3 Chapters: "Introduction", "Theory", p. 1/9 Chapter: Bill board, p. 5/9 Chapter-p. 3. stt,-p. 7, Age 3/9 "Generating Imposter age 6/9 Using Texture Packing for Efficient Imposter Generation and Rendering", p. 7 /9-p. 8/9.
Harris, M.J., "Real-Time Cloud Rendering for Games", Game Developers Conference Proceedings, XX, XX, Jan. 1, 2002 (Jan. 1, 2002), pp. 1-14, XP001091554, Figures 5-7, Abstract chapters: 1 "Introduction", 2 "Shading and Rendering", p. 1-p. 3, Chapter 2:3 "Rendering Algorithm", p. 7, Chapters: 3, "Dynamically Generated Impostors", 4 "Results and Discussion", p. 9-p. 12.
International Search Report and Written Opinion—PCT/US2021/045801—ISA/EPO—dated Dec. 6, 2021.
Yang X., et al., "Visual Effects in Computer Games", Computer, IEEE, USA, vol. 6, No. 7, Jul. 1, 2009 (Jul. 1, 2009), pp. 48-56, XP011264208, ISSN:0018-9162, Figure 4 Chapter: "Particle systems": p. 52-p. 53.

\* cited by examiner

BILLBOARD LAYERS IN OBJECT-SPACE RENDERING

CROSS REFERENCE TO RELATED APPLICATION(S)

This application claims the benefit of U.S. Provisional Application Ser. No. 63/067,050, entitled "METHODS AND APPARATUS FOR BILLBOARD LAYERS IN OBJECT-SPACE RENDERING" and filed on Aug. 18, 2020, which is expressly incorporated by reference herein in its entirety.

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

BRIEF SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a server, a client device, a central processing unit (CPU), a graphics processing unit (GPU), or any apparatus that may perform graphics processing. The apparatus may calculate an amount of a plurality of billboards associated with a viewpoint of a first frame. The apparatus may also configure a plurality of billboards associated with a viewpoint of a first frame of a plurality of frames, the plurality of billboards being configured in one or more layers at least partially around the viewpoint, the configuration of the plurality of billboards being based on one or more volumetric elements between at least one of the plurality of billboards and the viewpoint. The apparatus may also generate the plurality of billboards associated with the viewpoint of the first frame, where the plurality of billboards is generated based on the configuration of the plurality of billboards. Additionally, the apparatus may render an image associated with each of the one or more volumetric elements between at least one billboard of the plurality of billboards and the viewpoint, the rendered image including a set of pixels. The apparatus may also calculate a configuration for the mapping based on at least one of a geometric configuration of the one or more volumetric elements or a geometric configuration of the plurality of billboards. Further, the apparatus may map the data to the at least one billboard of the plurality of billboards based on the rendered image associated with each of the one or more volumetric elements. The apparatus may also store data in the at least one billboard of the plurality of billboards based on the rendered image associated with each of the one or more volumetric elements, the data corresponding to the set of pixels. Moreover, the apparatus may blend the at least one billboard of the plurality of billboards based on the data stored in the at least one billboard. The apparatus may also adjust the configuration of the plurality of billboards based on at least one of the viewpoint or the one or more volumetric elements.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
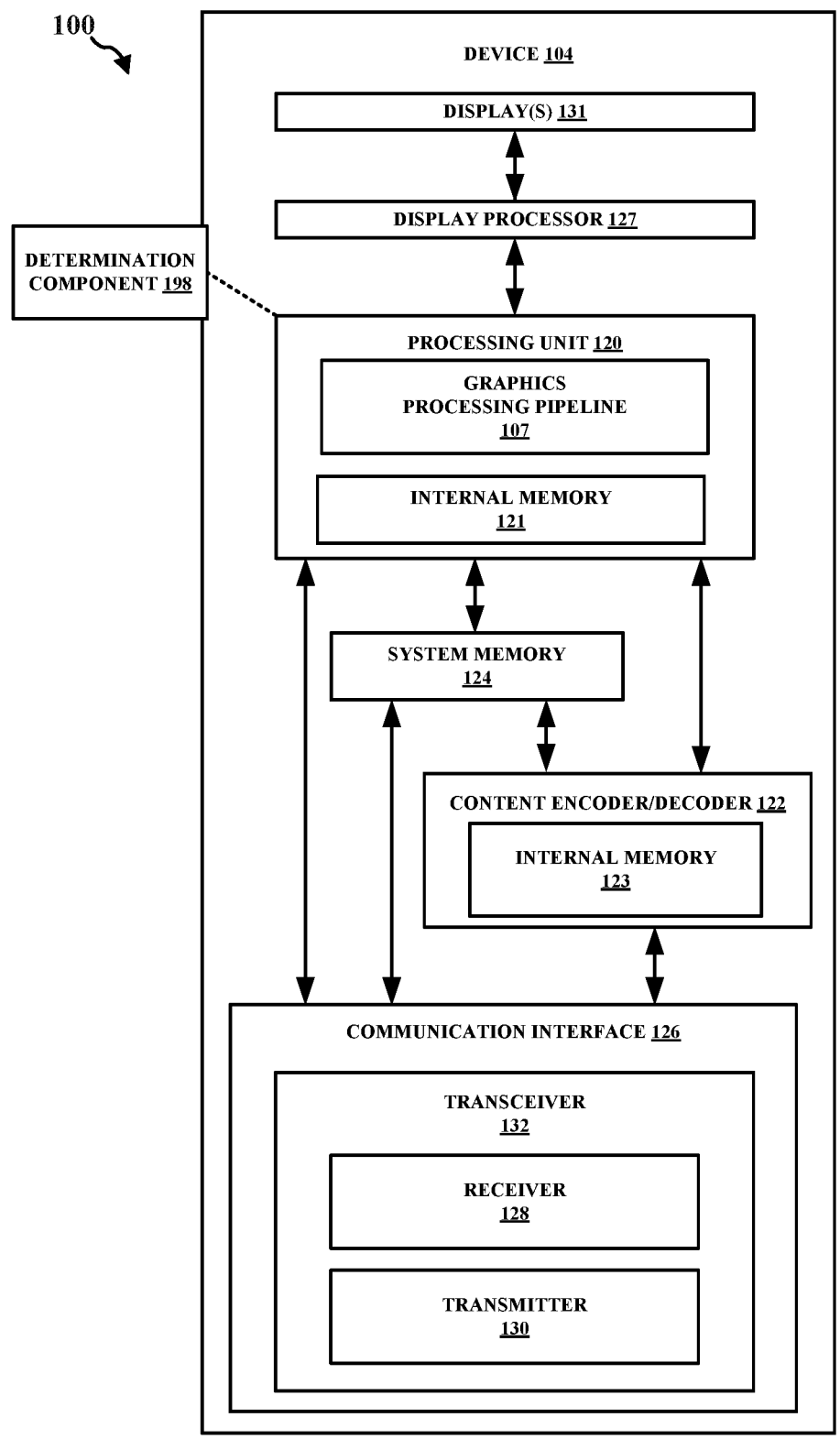
FIG. 1 is a block diagram that illustrates an example content generation system in accordance with one or more techniques of this disclosure.

Object-space rendering may be used for streaming split-rendering applications. Also, object-space rendering may store shading information for each surface point in a scene or frame. In some aspects, this may utilize unique texture coordinate for each surface point. Volumetric effects (VFX), such as fog, liquids, particle systems (e.g., fire, rain, etc.) may not define surfaces. Object-space rendering of VFX may address shading information per three-dimensional (3D) point in a scene or frame. Additionally, an index may be sparse, such as storing information where an object is visible (e.g., a particle). Aspects of the present disclosure may determine how to place the billboards or layers, e.g., in object-space rendering. Aspects of the present disclosure may also determine how to assign shading information to billboards or layers in object-space rendering. Further, aspects of the present disclosure may determine when to refresh billboards or layers in object-space rendering.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "products of 3D graphics design," their rendition, i.e., "images," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example system 100 configured to implement one or more techniques of this disclosure. The system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to calculate an amount of a plurality of billboards associated with a viewpoint of a first frame. The determination component 198 may also be configured to configure a plurality of billboards associated with a viewpoint of a first frame of a plurality of frames, the plurality of billboards being configured in one or more layers at least partially around the viewpoint, the configuration of the plurality of billboards being based on one or more volumetric elements between at least one of the plurality of billboards and the viewpoint. The determination component 198 may also be configured to generate the plurality of billboards associated with the viewpoint of the first frame, where the plurality of billboards is generated based on the configuration of the plurality of billboards. The determination component 198 may also be configured to render an image associated with each of the one or more volumetric elements between at least one billboard of the plurality of billboards and the viewpoint, the rendered image including a set of pixels. The determination component 198 may also be configured to calculate a configuration for the mapping based on at least one of a geometric configuration of the one or more volumetric elements or a geometric configuration of the plurality of billboards. The determination component 198 may also be configured to map the data to the at least one billboard of the plurality of billboards based on the rendered image associated with each of the one or more volumetric elements. The determination component 198 may also be configured to store data in the at least one billboard of the plurality of billboards based on the rendered image associated with each of the one or more volumetric elements, the data corresponding to the set of pixels. The determination component 198 may also be configured to blend the at least one billboard of the plurality of billboards based on the data stored in the at least one billboard. The determination component 198 may also be configured to adjust the configuration of the plurality of billboards based on at least one of the viewpoint or the one or more volumetric elements.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. Moreover, in the binning pass, different primitives can be shaded in certain bins, e.g., using draw calls. In some aspects, during the binning pass, a visibility stream can be constructed where visible primitives or draw calls can be identified.

In some aspects of rendering, there can be multiple processing phases or passes. For instance, the rendering can be performed in two passes, e.g., a visibility pass and a rendering pass. During a visibility pass, a GPU can input a rendering workload, record the positions of primitives or triangles, and then determine which primitives or triangles fall into which portion of a frame. In some aspects of a visibility pass, GPUs can also identify or mark the visibility of each primitive or triangle in a visibility stream. During a rendering pass, a GPU can input the visibility stream and process one portion of a frame at a time. In some aspects, the visibility stream can be analyzed to determine which primitives are visible or not visible. As such, the primitives that are visible may be processed. By doing so, GPUs can reduce the unnecessary workload of processing or rendering primitives that are not visible.

In some aspects, rendering can be performed in multiple locations and/or on multiple devices, e.g., in order to divide the rendering workload between different devices. For example, the rendering can be split between a server and a client device, which can be referred to as "split rendering." In some instances, split rendering can be a method for bringing content to user devices or head mounted displays (HMDs), where a portion of the graphics processing can be performed outside of the device or HMD, e.g., at a server.

Split rendering can be performed for a number of different types of applications, e.g., virtual reality (VR) applications, augmented reality (AR) applications, and/or extended reality (XR) applications. In VR applications, the content displayed at the user device can correspond to man-made or animated content, e.g., content rendered at a server or user device. In AR or XR content, a portion of the content displayed at the user device can correspond to real-world content, e.g., objects in the real world, and a portion of the content can be man-made or animated content. Also, the man-made or animated content and real-world content can be displayed in an optical see-through or a video see-through device, such that the user can view real-world objects and man-made or animated content simultaneously. In some aspects, man-made or animated content can be referred to as augmented content, or vice versa.

Split XR or AR systems can also introduce latency when delivering the rendered content to the client display. In some aspects, this latency can be even higher when rendering occurs on a server than compared to client rendering, but it can also enable more complex XR or AR applications. In addition, there can be non-negligible latency between the time a camera pose is computed and the time the content appears on the client display. For instance, a certain amount of latency may be present in split XR or AR systems. In some aspects, pixel information or eye buffer information for a scene can be determined or rendered at the server and sent to a client in separate billboards or layers. For example, an augmentation can be determined or rendered and sent to a client in one billboard or layer, and a real-world object can be determined and sent in another billboard or layer.

Figure 2:
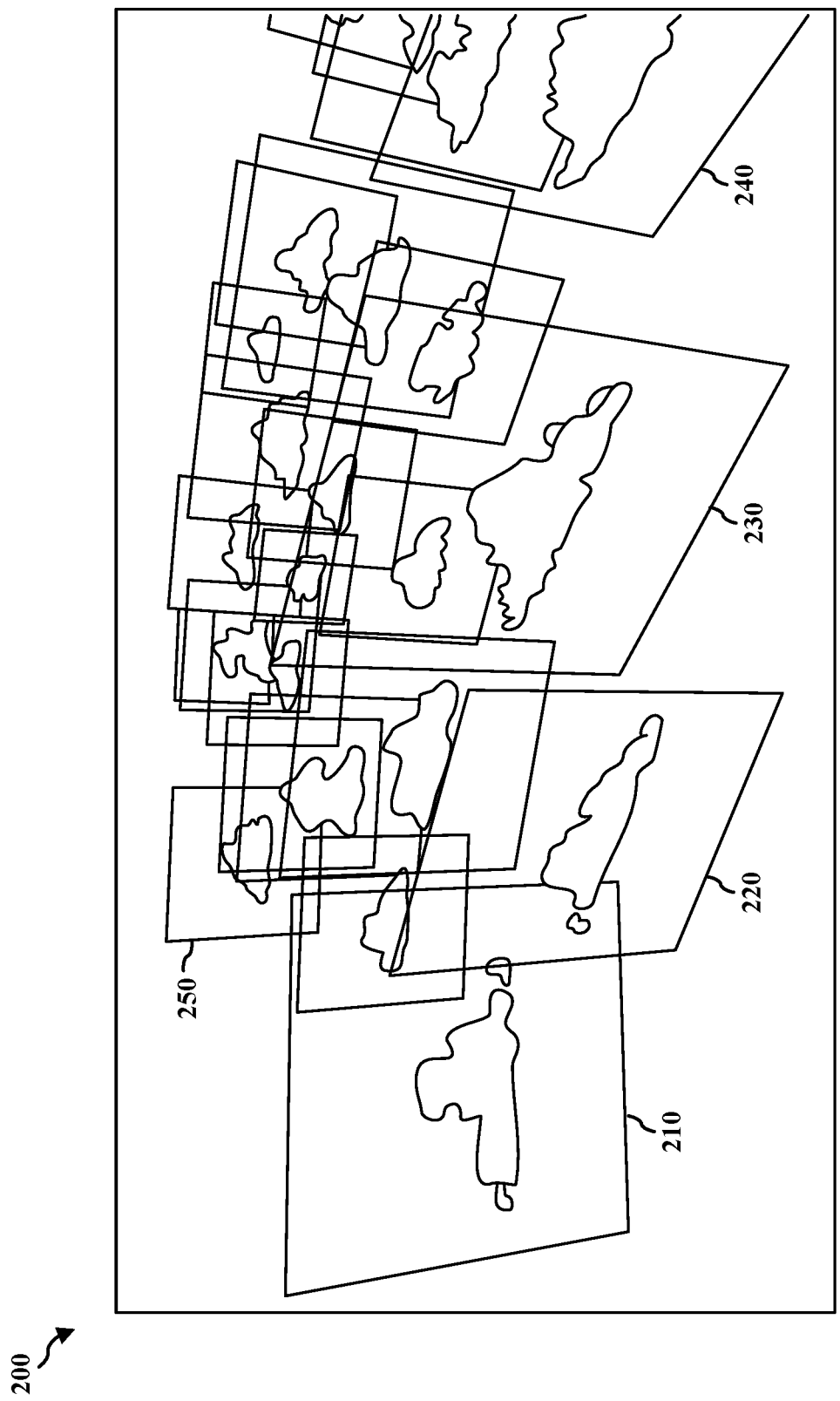
FIG. 2 illustrates a diagram of example depth-aligned billboards in accordance with one or more techniques of this disclosure.

FIG. 2 illustrates diagram 200 including depth-aligned billboards in accordance with one or more techniques of this disclosure. Diagram 200 includes billboards or layers 210, 220, 230, 240, and 250. As indicated above, billboards 210, 220, 230, 240, and 250 may represent different content, such as real-world content or augmented content. In addition, FIG. 2 displays the use of billboards 210, 220, 230, 240, and 250, in a pixel streaming architecture.

As shown in FIG. 2, a billboard is a set of textured shapes, e.g., rectangles (with alpha) or triangles, which may include a number of qualities. For instance, a billboard may face a user or viewer, as well as be aligned with some axis, e.g., an x-axis, a y-axis, or a z-axis. Billboards may be used in large quantities, where each billboard is relatively simple, e.g., a few textured rectangles or triangles. In some games or applications, billboards may display pre-rendered content, e.g., clouds. Some aspects of graphics processing may render volumetric effects (VFX) onto billboards. The rendering may also be dynamic, such as being updated every few frames, e.g., every second or third frame.

In some aspects of graphics processing, object-space rendering may be used for streaming split-rendering applications. For instance, object-space rendering may refer to streaming rendering or a split rendering pipeline where shading is performed in object-space. Also, object-space rendering may store shading information for each surface point in a scene or frame. In some aspects, the process of storing shading information for each surface point in a scene/frame may utilize a unique texture coordinate for each surface point in the scene/frame. Volumetric effects (VFX), such as fog, liquids, or particle systems (e.g., fire, rain, etc.) may not define surfaces in the scene/frame. Object-space rendering of VFX may address shading information per 3D point in the scene or frame. Additionally, an index may be sparse, such as storing information where an object is visible (e.g., a particle).

In some instances, object-space rendering may utilize billboards (i.e., textured quadrants). For example, billboards may be arranged within object-space rendering. Billboards may also utilize shading information. Based on the above, it may be beneficial to determine how to place or arrange billboards or layers in object-space rendering. It may also be beneficial to determine how to assign shading information to billboards or layers in object-space rendering. Moreover, it may be beneficial to determine when to refresh billboards or layers in object-space rendering, as well as how often to refresh billboards or layers.

Aspects of the present disclosure may determine how to place or arrange the billboards or layers in object-space rendering. Aspects of the present disclosure may also determine how to assign shading information to billboards or layers in object-space rendering. Further, aspects of the present disclosure may determine when to refresh billboards or layers in object-space rendering, as well as how often to refresh billboards or layers.

In some instances, aspects of the present disclosure may arrange billboards (i.e., textured quadrants) or layers concentrically around a user or viewer. Aspects of the present disclosure may also store billboards along with surface shading in an object-space shading buffer or shading atlas. When rendering VFX, aspects of the present disclosure may write shading information to a closest billboard pixel, rather than write to a normal framebuffer. Aspects of the present disclosure may also render a final image from regular objects and billboards.

Additionally, after the billboard generation and/or the rendering into the billboards, the billboards may be treated like any other geometric object, e.g., a transparent object, in a shading atlas. Handling certain aspects of a shading atlas, e.g., transparency in a shading atlas, may utilize a number of steps. For instance, a shading atlas may be encoded, e.g., moving picture experts group (MPEG) encoded, and sent to a client. The client may also decode the MPEG and/or use it to render texture-mapped primitives or triangles with alpha or an alpha value. The billboards (i.e., alpha-masked triangles) may blend naturally with the rest of a scene or frame.

Figure 3:
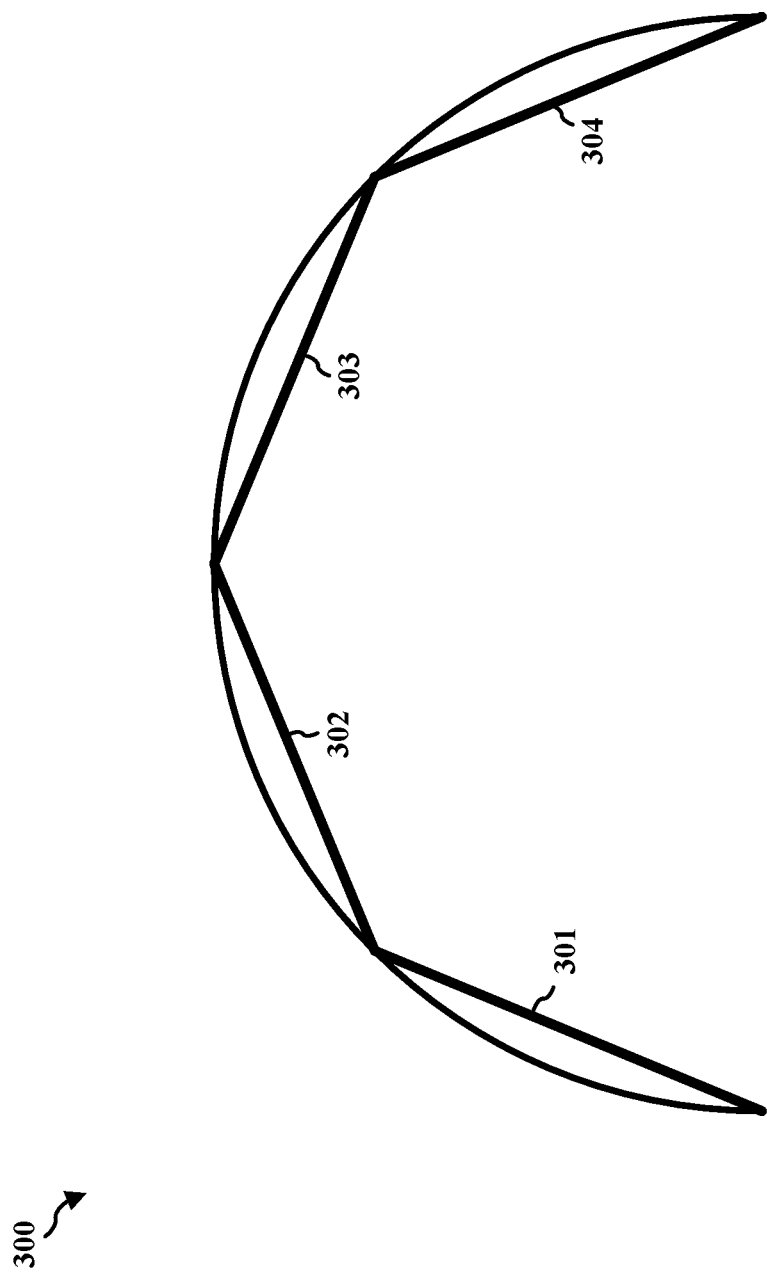
FIG. 3 illustrates a diagram of an example billboard configuration in accordance with one or more techniques of this disclosure.

FIG. 3 illustrates diagram 300 of an example billboard configuration in accordance with one or more techniques of this disclosure. Diagram 300 includes a number of billboards or layers, e.g., billboard 301, billboard 302, billboard 303, and billboard 304. As shown in FIG. 3, aspects of the present disclosure may place billboards, e.g., billboards 301-304, in concentric layers around a user or viewer. For instance, the billboards may be arranged in a cylindrical or spherical format, as shown in the billboard configuration in diagram 300. For example, the billboard configuration may be inside of a user's field of view (FOV), e.g., inside a 180 degree FOV.

Aspects of the present disclosure may also reduce the amount of billboards to a certain amount, i.e., a minimum amount of billboards. That is, aspects of the present disclosure may reduce the amount of billboards to the billboards that lie inside of a viewing frustum. Additionally, aspects of the present disclosure may reduce the amount of billboards to the billboards that receive some part or portion of the volumetric effects (VFX).

Figure 4A:
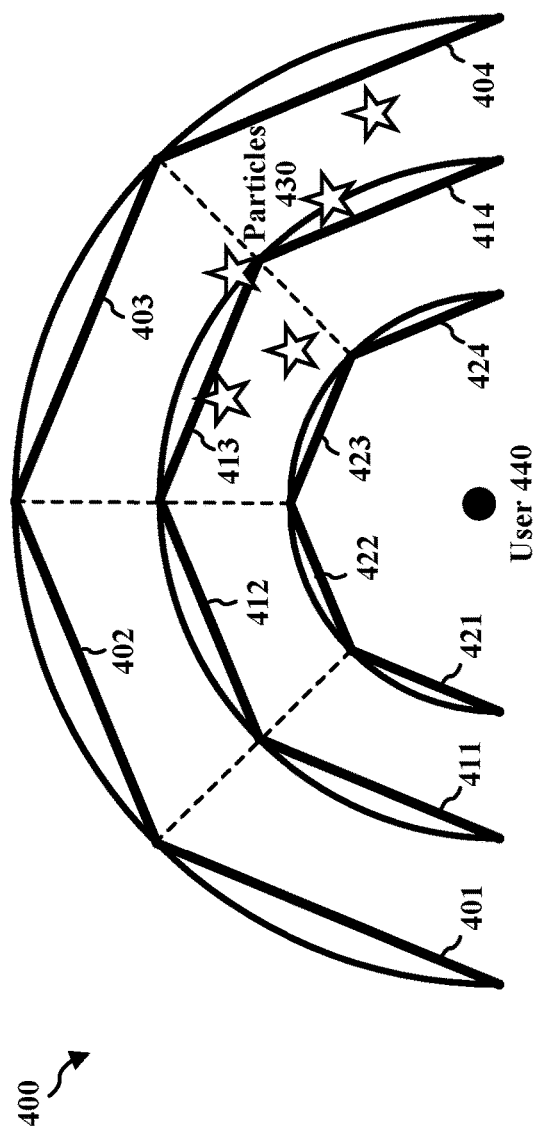
FIG. 4A illustrates a diagram of an example billboard configuration in accordance with one or more techniques of this disclosure.
Figure 4B:
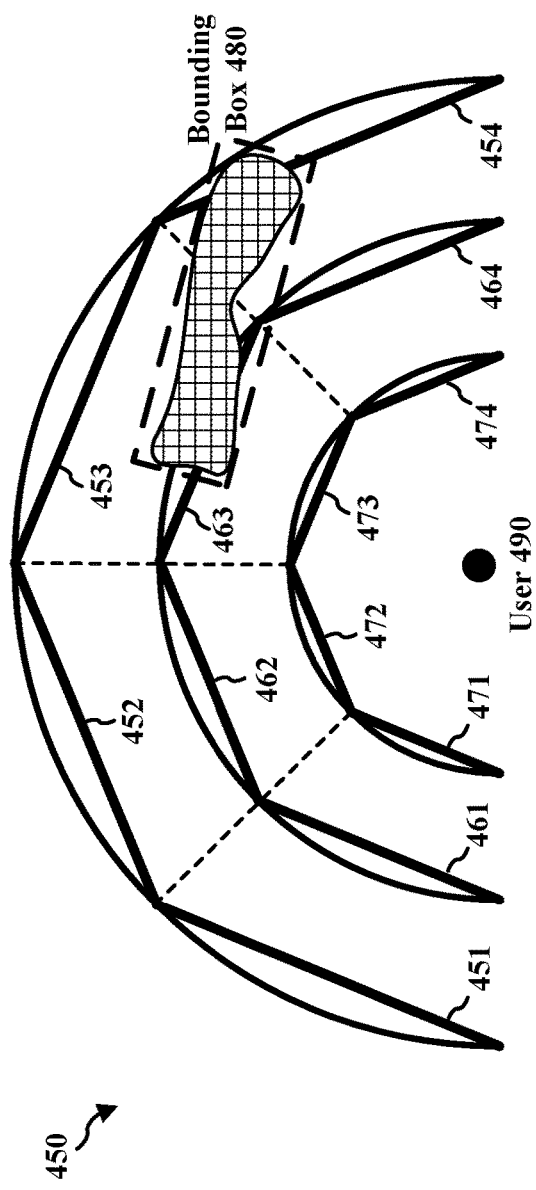
FIG. 4B illustrates a diagram of an example billboard configuration in accordance with one or more techniques of this disclosure.

FIGS. 4A and 4B illustrate diagrams 400 and 450, respectively, of example billboard configurations in accordance with one or more techniques of this disclosure. As shown in FIG. 4A, diagram 400 includes a number of billboards, e.g., billboards 401-404, 411-414, and 421-424, that are arranged in concentric layers around a user 440. Diagram 400 also includes particles or elements 430 (e.g., stars) amongst the billboards. As shown in FIG. 4A, aspects of the present disclosure may include a method for handling or assigning particles or elements that are near certain billboards, i.e., a particle-to-billboard (P2BB) assignment. For example, aspects of the present disclosure may determine the quantized polar coordinates of a particle center. The coordinates may be an index to select the correct billboard for assignment. This may be performed efficiently with an atomic increment in a compute shader. As shown in FIG. 4A, based on the P2BB assignment for particles 430, aspects of the present disclosure may render billboards 404, 413, 414, and 423.

As shown in FIG. 4B, diagram 450 includes a number of billboards, e.g., billboards 451-454, 461-464, and 471-474, that are arranged in concentric layers around a user 490. Diagram 450 also includes bounding box 480, e.g., a bounding box with fog, amongst the billboards. As shown in FIG. 4B, aspects of the present disclosure may also include a method for handling or assigning fog or particulate fields that are near the billboards. These methods may include a project oriented bounding box, e.g., bounding box 480, around the fog or particulate fields near the billboards, as shown in diagram 450. As shown in FIG. 4B, based on the assignment of bounding box 480, aspects of the present disclosure may render billboards 454, 463, 464, and 473.

Figure 5A:
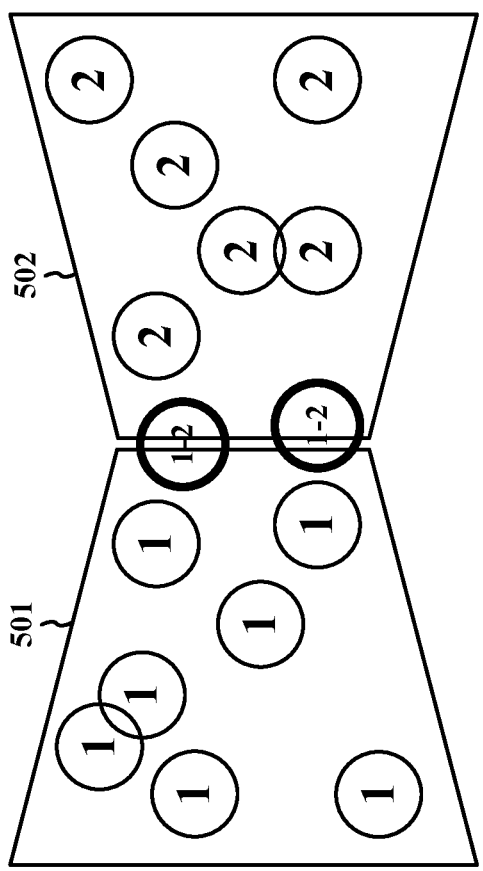
FIG. 5A illustrates a diagram of an example billboard configuration in accordance with one or more techniques of this disclosure.
Figure 5B:
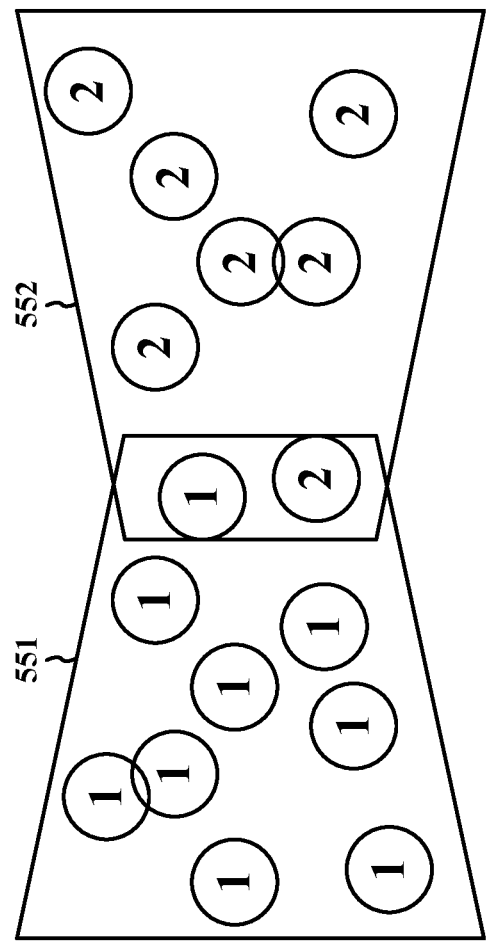
FIG. 5B illustrates a diagram of an example billboard configuration in accordance with one or more techniques of this disclosure.

FIGS. 5A and 5B illustrate diagrams 500 and 550, respectively, of example billboard configurations in accordance with one or more techniques of this disclosure. As shown in FIG. 5A, diagram 500 includes multiple billboards, e.g., billboard 501 and 502, and corresponding particles. Particles assigned to billboard 501 are shown as "1" and particles assigned to billboard 502 are shown as "2" in FIG. 5A. As shown in FIG. 5A, diagram 500 includes particles or elements that overlap adjacent billboards, e.g., particles "1-2" that overlap billboards 501 and 502. As the particles "1-2" overlap both of the adjacent billboards, this may present a problem of assigning the overlapping particles to one of the billboards 501 or 502.

As shown in FIG. 5B, diagram 550 shows how aspects of the present disclosure may resolve this issue of overlapping particles for adjacent billboards. For instance, aspects of the present disclosure may utilize overlapping billboards to handle the overlapping particles. Diagram 550 includes overlapping billboards, e.g., billboard 551 and 552, and corresponding particles. Particles assigned to billboard 551 are shown as "1" and particles assigned to billboard 552 are shown as "2" in FIG. 5A. Overlapping particles may be more easily assigned to one of the two overlapping billboards, e.g., billboards 551 and 552. For example, by utilizing overlapping billboards, one of the overlapping particles may be assigned to billboard 551 as "1" and another of the overlapping particles may be assigned to billboard 552 as "2" in FIG. 5B. Aspects of the present disclosure may utilize a number of steps or processes to assign particles to overlapping billboards.

Figure 6:
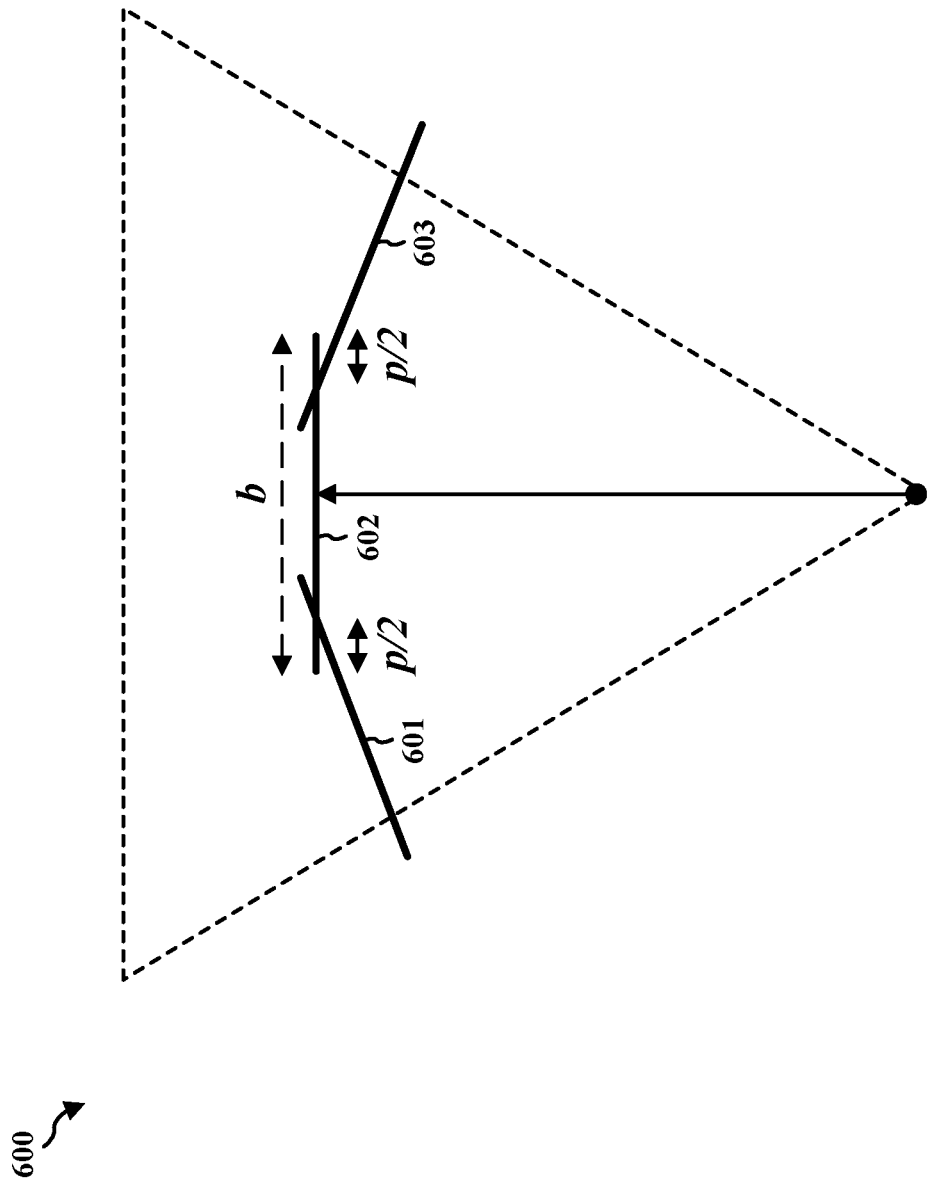
FIG. 6 illustrates a diagram of an example billboard configuration in accordance with one or more techniques of this disclosure.

FIG. 6 illustrates diagram 600 of an example billboard configuration in accordance with one or more techniques of this disclosure. Diagram 600 in FIG. 6 displays three adjacent billboards, e.g., billboard 601, 602, and 603. Each of the billboards 601-603 include a certain length, e.g., length b. As shown in FIG. 6, for overlapping billboards, aspects of the present disclosure may determine a largest particle size, e.g., particle size p. After doing so, aspects of the present disclosure may configure the adjacent billboards to overlap by a certain length, e.g., p/2, on either side of the billboard. For example, billboard 602 may overlap by p/2 on each side. This may allow aspects of the present disclosure to render an entire particle to a single billboard, e.g., render an entire particle to billboard 602.

Figure 7:
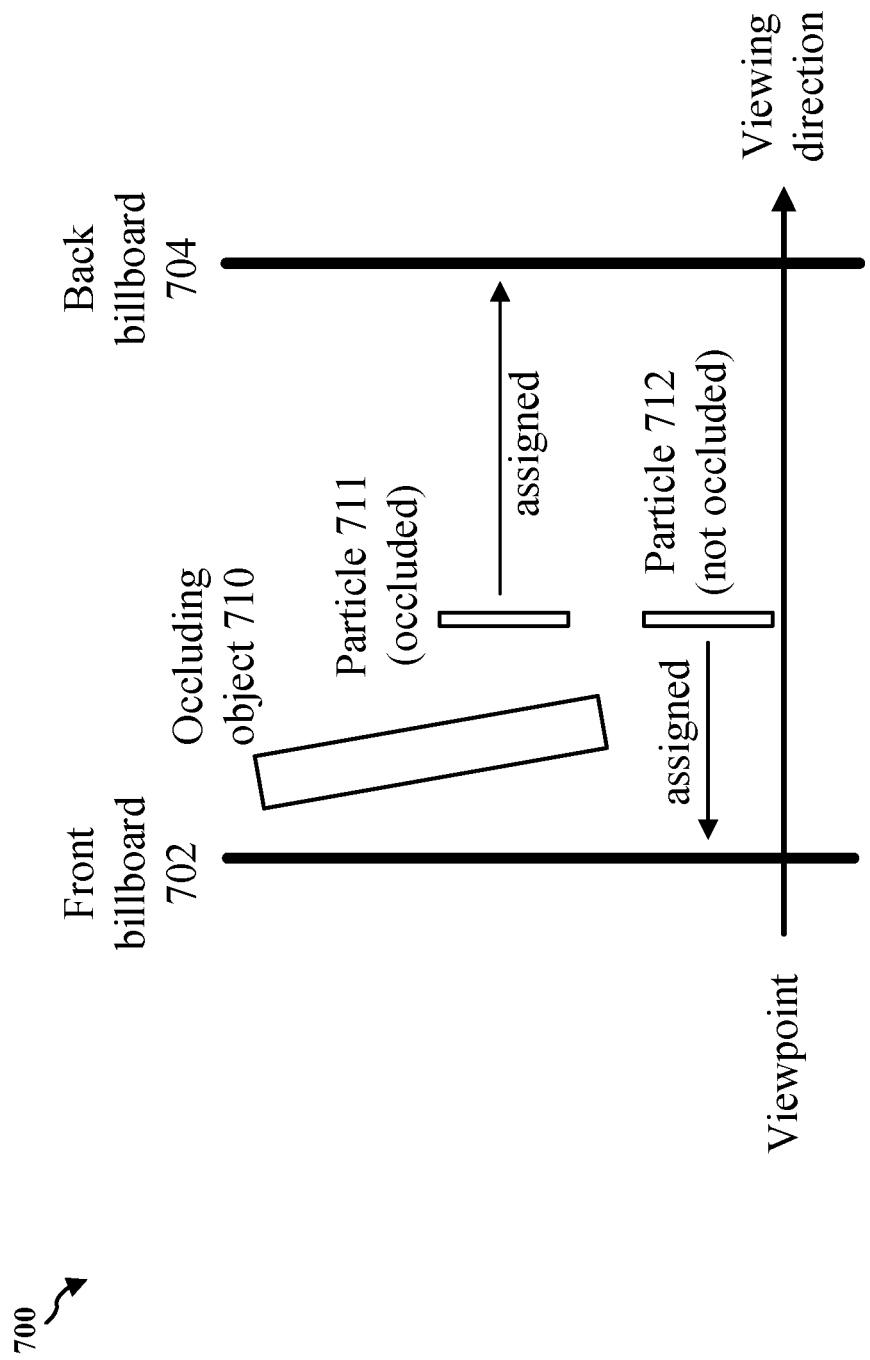
FIG. 7 illustrates a diagram of an example billboard configuration in accordance with one or more techniques of this disclosure.

FIG. 7 illustrates diagram 700 of an example billboard configuration in accordance with one or more techniques of this disclosure. Diagram 700 in FIG. 7 includes front billboard 702, back billboard 704, occluding object or occluder 710, particle 711, and particle 712. FIG. 7 shows that front billboard 702 and back billboard 704 are determined based on the viewing direction. Also, particle 711 is occluded by occluding object 710, while particle 712 is not occluded. As shown in FIG. 7, during a particle-to-billboard (P2BB) assignment, aspects of the present disclosure may perform a depth test. The depth test may determine if a particle is assigned to a billboard closer to a viewpoint, i.e., front billboard 702, or a billboard farther away from the viewpoint, i.e., back billboard 704. Additionally, when rendering the billboards or layers, aspects of the present disclosure may enable a depth test with a regular geometry in order to reject occluded billboard fragments.

FIG. 7 shows that when an occluding object (e.g., occluding object 710) is between the viewpoint and a particle (e.g., particle 711), such that the particle is occluded, then the particle may be assigned to a billboard that is farther away from the viewpoint (e.g., back billboard 704). Also, when there is no occluding object between the viewpoint and a particle (e.g., particle 712), such that the particle is not occluded, then the particle may be assigned to a billboard that is closer to the viewpoint (e.g., front billboard 702). Otherwise, the particle may be assigned to the billboard that is closest to the particle, or the particle may be assigned to the front billboard (i.e., the billboard that is closer to the viewpoint).

In some aspects, after a P2BB assignment, aspects of the present disclosure may render the VFX into the billboards. For particles or elements, aspects of the present disclosure may render each particle or element. In a vertex shader, aspects of the present disclosure may set up a camera frustum to cover the billboard assigned to a particle. Aspects of the present disclosure may also render the particle with output to the atlas area for the billboard. For fog, liquids, or particulate fields near billboards, aspects of the present disclosure may render the billboards with increasing distance to the camera. For every billboard texel, aspects of the present disclosure may render the contribution along the view ray from a previous layer to a current layer.

Aspects of the present disclosure may also determine when to refresh billboards. Billboards may remain in place and may be re-used in a next frame, e.g., if a camera moves a small amount. Billboards may also be repositioned and VFX re-rendered if the camera moves an amount greater than a threshold. Aspects of the present disclosure may also determine if the camera moves by computing the worst-case disparity over each of the billboards. Further, billboards may be repositioned and VFX re-rendered if the content of VFX changes (e.g., animated fire). Billboards may also be repositioned and VFX re-rendered if new billboards become visible. This may occur if the position of the VFX in the scene has changed, or it the camera moves and a part of the VFX is disoccluded.

Aspects of the present disclosure may include a system that uses billboards to enable object-space rendering of VFX. Aspects of the present disclosure may also include a system that updates a billboard arrangement (e.g., a number, placement, and content of billboards) dynamically to react to camera movement and changes in the scene. Additionally, aspects of the present disclosure may include a system that selects a billboard arrangement based on concentric layers inside a camera frustum. Aspects of the present disclosure may also include a system that uses overlapping billboards to support a mapping, e.g., a 1:1 mapping, of particles to billboards. Moreover, aspects of the present disclosure may include a system that uses occlusions between particles and opaque scene objects to determine a particle-to-billboard (P2BB) assignment. In some instances, aspects of the present disclosure may also relate to streaming content.

Figure 8:
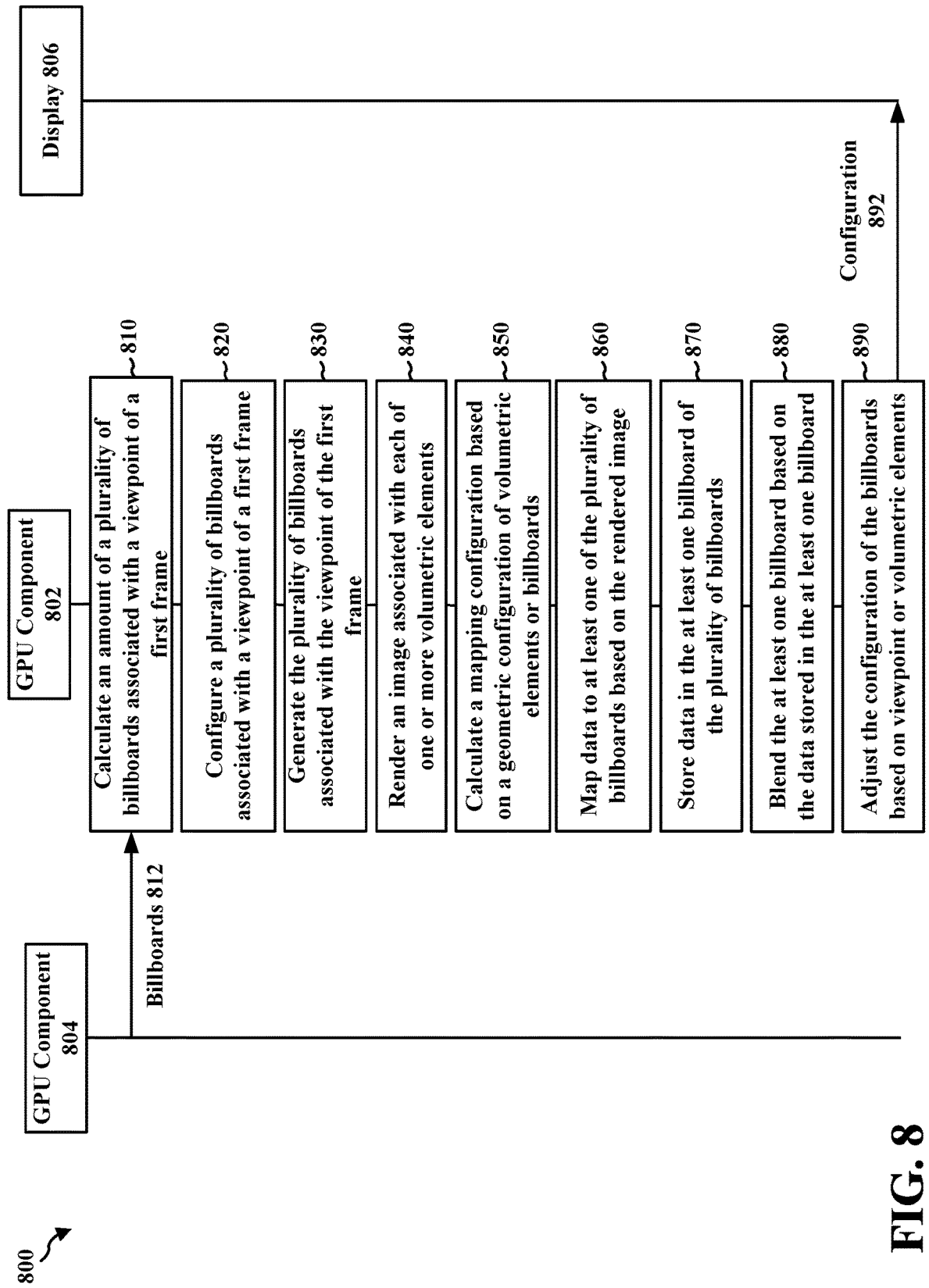
FIG. 8 is a communication flow diagram illustrating example communications between components in accordance with one or more techniques of this disclosure.

FIG. 8 is a communication flow diagram 800 of graphics processing in accordance with one or more techniques of this disclosure. As shown in FIG. 8, diagram 800 includes example communications between GPU component 802, GPU component 804, and display 806 in accordance with one or more techniques of this disclosure.

At 810, GPU component 802 may calculate an amount of a plurality of billboards, e.g., billboards 812, associated with a viewpoint of a first frame. The amount of the plurality of billboards may be calculated based on at least one of a resolution quality of the first frame, one or more volumetric elements, a bandwidth of a rendered image, or a rendering time of a rendered image. Also, the plurality of billboards, e.g., billboards 812, may be received from another component, e.g., GPU component 804.

At 820, GPU component 802 may configure a plurality of billboards associated with a viewpoint of a first frame of a plurality of frames, the plurality of billboards being configured in one or more layers at least partially around the viewpoint, the configuration of the plurality of billboards being based on one or more volumetric elements between at least one of the plurality of billboards and the viewpoint. The configuration of the plurality of billboards may be based on a portion of at least one billboard of the plurality of billboards overlapping with a portion of at least one other billboard of the plurality of billboards. Further, the plurality of billboards may be configured based on a viewpoint of at least one subsequent frame of the plurality of frames.

In some aspects, the one or more volumetric elements may be associated with a first billboard of the plurality of billboards, and the first billboard may be a billboard farthest from the viewpoint when an occluding object is between the one or more volumetric elements and the viewpoint. Also, the one or more volumetric elements may be associated with a second billboard of the plurality of billboards, and the second billboard may be a billboard closest to the viewpoint. Additionally, each of the one or more layers may be associated with a distance from the viewpoint. The distance from the viewpoint for each of the one or more layers may be associated with the configuration of the billboards. The configuration of the billboards may be associated with a configuration of the one or more volumetric elements.

At 830, GPU component 802 may generate the plurality of billboards associated with the viewpoint of the first frame, where the plurality of billboards is generated based on the configuration of the plurality of billboards.

At 840, GPU component 802 may render an image associated with each of the one or more volumetric elements between at least one billboard of the plurality of billboards and the viewpoint, the rendered image including a set of pixels. The image may be a semi-transparent image.

At 850, GPU component 802 may calculate a configuration for the mapping based on at least one of a geometric configuration of the one or more volumetric elements or a geometric configuration of the plurality of billboards.

At 860, GPU component 802 may map the data to the at least one billboard of the plurality of billboards based on the rendered image associated with each of the one or more volumetric elements. In some aspects, the mapping may be a projective geometric mapping or a geometric projection.

At 870, GPU component 802 may store data in the at least one billboard of the plurality of billboards based on the rendered image associated with each of the one or more volumetric elements, the data corresponding to the set of pixels. The data may be at least one of pixel data or texture data.

At 880, GPU component 802 may blend the at least one billboard of the plurality of billboards based on the data stored in the at least one billboard. In some instances, the at least one billboard may be blended based on one or more blending weights, and the one or more blending weights may be computed based on at least one of a transparency of the set of pixels or a depth of the set of pixels.

At 890, GPU component 802 may adjust the configuration of the plurality of billboards, e.g., configuration 892, based on at least one of the viewpoint or the one or more volumetric elements. The configuration of the plurality of billboards may be adjusted by adjusting an amount of the plurality of billboards or adjusting a geometric transformation of the plurality of billboards. Also, the configuration of the plurality of billboards may be adjusted if the viewpoint is adjusted or the one or more volumetric elements are adjusted. The one or more volumetric elements may be adjusted by adjusting an amount of the one or more volumetric elements or adjusting a geometric transformation of the one or more volumetric elements. Also, the configuration of the plurality of billboards, e.g., configuration 892, may be transmitted to another component, e.g., display 806.

Figure 9:
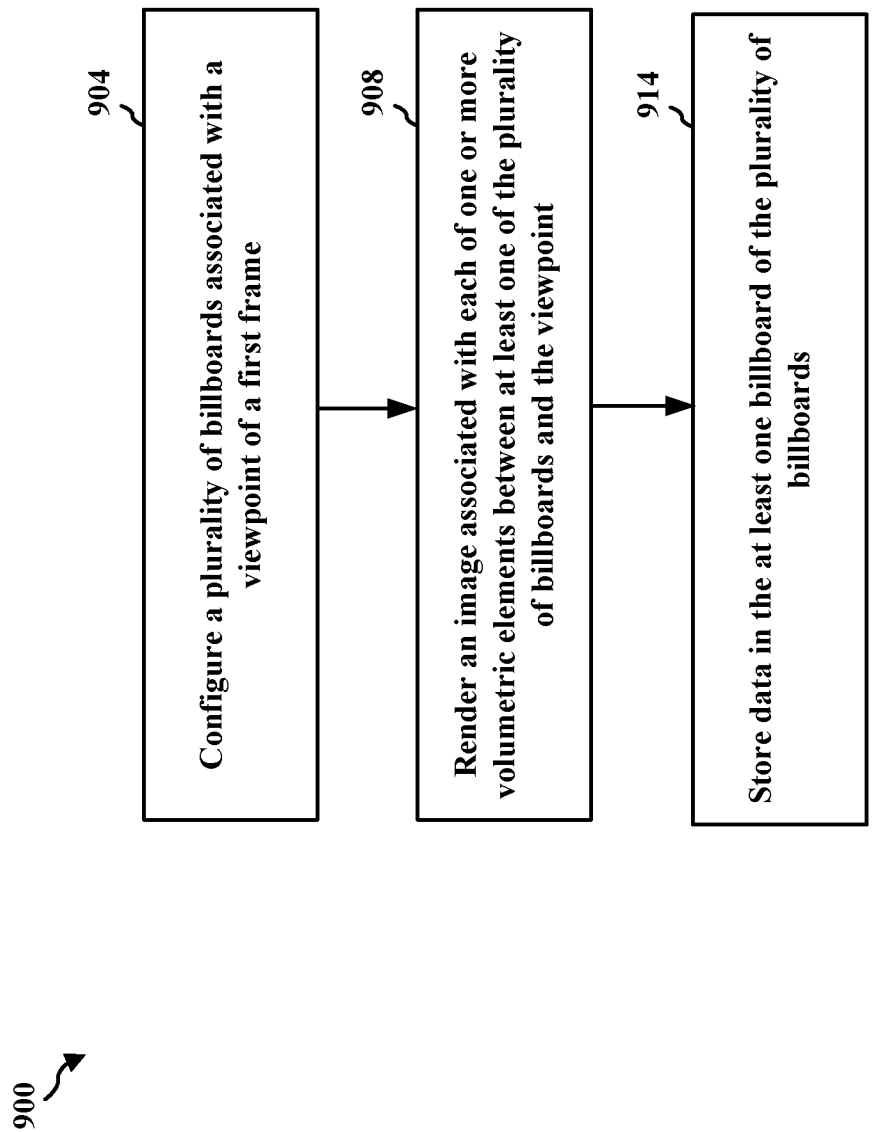
FIG. 9 illustrates an example flowchart of an example method in accordance with one or more techniques of this disclosure.

FIG. 9 illustrates an example flowchart 900 of an example method in accordance with one or more techniques of this disclosure. The method may be performed by an apparatus such as a server, a client device, a GPU, a CPU, or an apparatus for graphics processing.

At 904, the apparatus may configure a plurality of billboards associated with a viewpoint of a first frame of a plurality of frames, the plurality of billboards being configured in one or more layers at least partially around the viewpoint, the configuration of the plurality of billboards being based on one or more volumetric elements between at least one of the plurality of billboards and the viewpoint, as described in connection with the examples in FIGS. 2-8. For example, GPU component 802 may configure a plurality of billboards associated with a viewpoint of a first frame of a plurality of frames, the plurality of billboards being configured in one or more layers at least partially around the viewpoint, the configuration of the plurality of billboards being based on one or more volumetric elements between at least one of the plurality of billboards and the viewpoint, as described in 820 of FIG. 8. Further, processing unit 120 in FIG. 1 may perform step 904. The configuration of the plurality of billboards may be based on a portion of at least one billboard of the plurality of billboards overlapping with a portion of at least one other billboard of the plurality of billboards. Further, the plurality of billboards may be configured based on a viewpoint of at least one subsequent frame of the plurality of frames.

In some aspects, the one or more volumetric elements may be associated with a first billboard of the plurality of billboards, and the first billboard may be a billboard farthest from the viewpoint when an occluding object is between the one or more volumetric elements and the viewpoint. Also, the one or more volumetric elements may be associated with a second billboard of the plurality of billboards, and the second billboard may be a billboard closest to the viewpoint. Additionally, each of the one or more layers may be associated with a distance from the viewpoint. The distance from the viewpoint for each of the one or more layers may be associated with the configuration of the billboards. The configuration of the billboards may be associated with a configuration of the one or more volumetric elements.

At 908, the apparatus may render an image associated with each of the one or more volumetric elements between at least one billboard of the plurality of billboards and the viewpoint, the rendered image including a set of pixels, as described in connection with the examples in FIGS. 2-8. For example, GPU component 802 may render an image associated with each of the one or more volumetric elements between at least one billboard of the plurality of billboards and the viewpoint, the rendered image including a set of pixels, as described in 840 of FIG. 8. Further, processing unit 120 in FIG. 1 may perform step 908. In some instances, the image may be a semi-transparent image.

At 914, the apparatus may store data in the at least one billboard of the plurality of billboards based on the rendered image associated with each of the one or more volumetric elements, the data corresponding to the set of pixels, as described in connection with the examples in FIGS. 2-8. For example, GPU component 802 may store data in the at least one billboard of the plurality of billboards based on the rendered image associated with each of the one or more volumetric elements, the data corresponding to the set of pixels, as described in 870 of FIG. 8. Further, processing unit 120 in FIG. 1 may perform step 914. The data may be at least one of pixel data or texture data.

Figure 10:
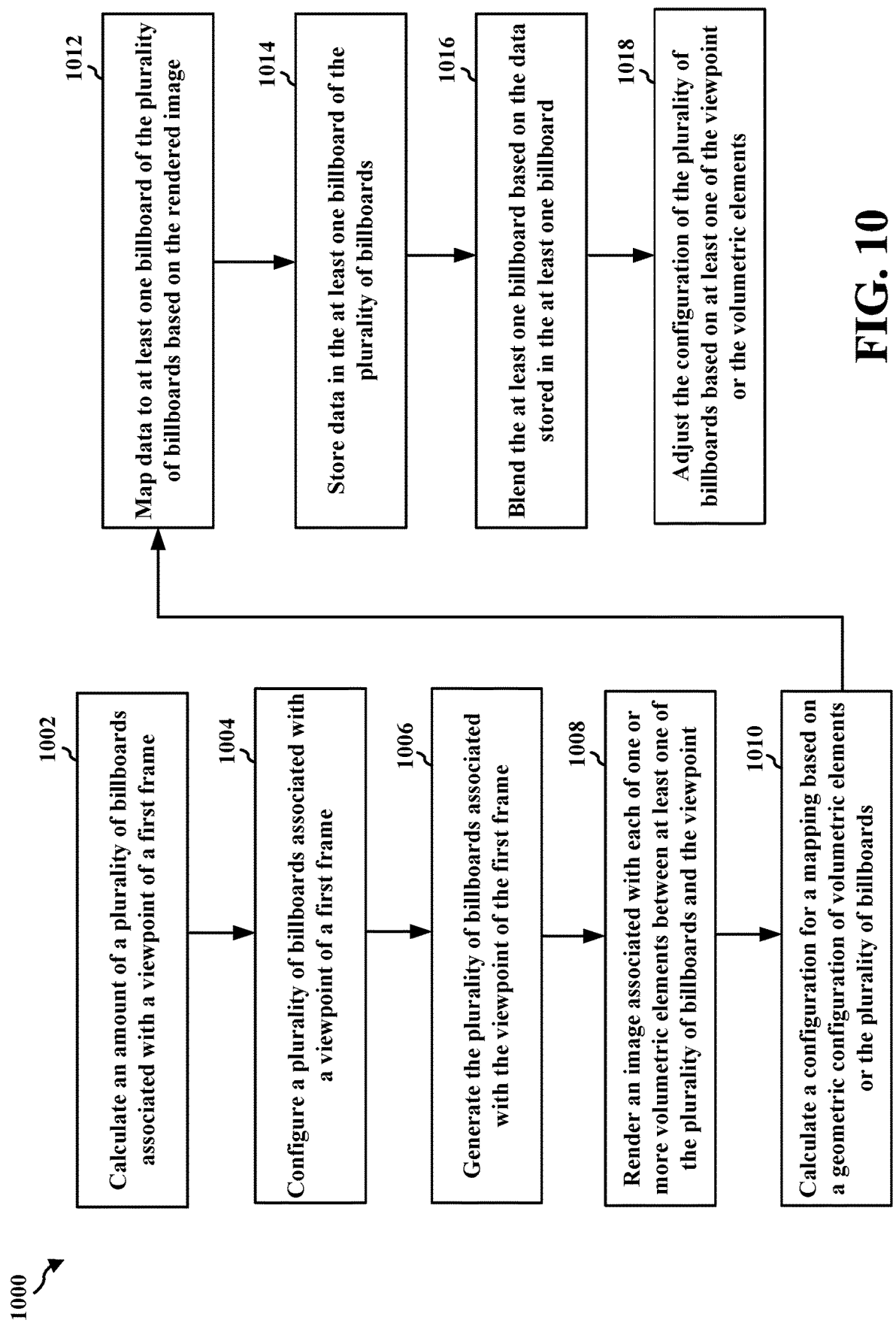
FIG. 10 illustrates an example flowchart of an example method in accordance with one or more techniques of this disclosure.

FIG. 10 illustrates an example flowchart 1000 of an example method in accordance with one or more techniques of this disclosure. The method may be performed by an apparatus such as a server, a client device, a GPU, a CPU, or an apparatus for graphics processing.

At 1002, the apparatus may calculate an amount of a plurality of billboards associated with a viewpoint of a first frame, as described in connection with the examples in FIGS. 2-8. For example, GPU component 802 may calculate an amount of a plurality of billboards associated with a viewpoint of a first frame, as described in 810 of FIG. 8. Further, processing unit 120 in FIG. 1 may perform step 1002. The amount of the plurality of billboards may be calculated based on at least one of a resolution quality of the first frame, one or more volumetric elements, a bandwidth of a rendered image, or a rendering time of a rendered image.

At 1004, the apparatus may configure a plurality of billboards associated with a viewpoint of a first frame of a plurality of frames, the plurality of billboards being configured in one or more layers at least partially around the viewpoint, the configuration of the plurality of billboards being based on one or more volumetric elements between at least one of the plurality of billboards and the viewpoint, as described in connection with the examples in FIGS. 2-8. For example, GPU component 802 may configure a plurality of billboards associated with a viewpoint of a first frame of a plurality of frames, the plurality of billboards being configured in one or more layers at least partially around the viewpoint, the configuration of the plurality of billboards being based on one or more volumetric elements between at least one of the plurality of billboards and the viewpoint, as described in 820 of FIG. 8. Further, processing unit 120 in FIG. 1 may perform step 1004. The configuration of the plurality of billboards may be based on a portion of at least one billboard of the plurality of billboards overlapping with a portion of at least one other billboard of the plurality of billboards. Further, the plurality of billboards may be configured based on a viewpoint of at least one subsequent frame of the plurality of frames.

In some aspects, the one or more volumetric elements may be associated with a first billboard of the plurality of billboards, and the first billboard may be a billboard farthest from the viewpoint when an occluding object is between the one or more volumetric elements and the viewpoint. Also, the one or more volumetric elements may be associated with a second billboard of the plurality of billboards, and the second billboard may be a billboard closest to the viewpoint. Additionally, each of the one or more layers may be associated with a distance from the viewpoint. The distance from the viewpoint for each of the one or more layers may be associated with the configuration of the billboards. The configuration of the billboards may be associated with a configuration of the one or more volumetric elements.

At 1006, the apparatus may generate the plurality of billboards associated with the viewpoint of the first frame, where the plurality of billboards is generated based on the configuration of the plurality of billboards, as described in connection with the examples in FIGS. 2-8. For example, GPU component 802 may generate the plurality of billboards associated with the viewpoint of the first frame, where the plurality of billboards is generated based on the configuration of the plurality of billboards, as described in 830 of FIG. 8. Further, processing unit 120 in FIG. 1 may perform step 1006.

At 1008, the apparatus may render an image associated with each of the one or more volumetric elements between at least one billboard of the plurality of billboards and the viewpoint, the rendered image including a set of pixels, as described in connection with the examples in FIGS. 2-8. For example, GPU component 802 may render an image associated with each of the one or more volumetric elements between at least one billboard of the plurality of billboards and the viewpoint, the rendered image including a set of pixels, as described in 840 of FIG. 8. Further, processing unit 120 in FIG. 1 may perform step 1008. In some instances, the image may be a semi-transparent image.

At 1010, the apparatus may calculate a configuration for the mapping based on at least one of a geometric configuration of the one or more volumetric elements or a geometric configuration of the plurality of billboards, as described in connection with the examples in FIGS. 2-8. For example, GPU component 802 may calculate a configuration for the mapping based on at least one of a geometric configuration of the one or more volumetric elements or a geometric configuration of the plurality of billboards, as described in 850 of FIG. 8. Further, processing unit 120 in FIG. 1 may perform step 1010.

At 1012, the apparatus may map the data to the at least one billboard of the plurality of billboards based on the rendered image associated with each of the one or more volumetric elements, as described in connection with the examples in FIGS. 2-8. For example, GPU component 802 may map the data to the at least one billboard of the plurality of billboards based on the rendered image associated with each of the one or more volumetric elements, as described in 860 of FIG. 8. Further, processing unit 120 in FIG. 1 may perform step 1012. In some aspects, the mapping may be a projective geometric mapping or a geometric projection.

At 1014, the apparatus may store data in the at least one billboard of the plurality of billboards based on the rendered image associated with each of the one or more volumetric elements, the data corresponding to the set of pixels, as described in connection with the examples in FIGS. 2-8. For example, GPU component 802 may store data in the at least one billboard of the plurality of billboards based on the rendered image associated with each of the one or more volumetric elements, the data corresponding to the set of pixels, as described in 870 of FIG. 8. Further, processing unit 120 in FIG. 1 may perform step 1014. The data may be at least one of pixel data or texture data.

At 1016, the apparatus may blend the at least one billboard of the plurality of billboards based on the data stored in the at least one billboard, as described in connection with the examples in FIGS. 2-8. For example, GPU component 802 may blend the at least one billboard of the plurality of billboards based on the data stored in the at least one billboard, as described in 880 of FIG. 8. Further, processing unit 120 in FIG. 1 may perform step 1016. In some instances, the at least one billboard may be blended based on one or more blending weights, and the one or more blending weights may be computed based on at least one of a transparency of the set of pixels or a depth of the set of pixels.

At 1018, the apparatus may adjust the configuration of the plurality of billboards based on at least one of the viewpoint or the one or more volumetric elements, as described in connection with the examples in FIGS. 2-8. For example, GPU component 802 may adjust the configuration of the plurality of billboards based on at least one of the viewpoint or the one or more volumetric elements, as described in 890 of FIG. 8. Further, processing unit 120 in FIG. 1 may perform step 1018. The configuration of the plurality of billboards may be adjusted by adjusting an amount of the plurality of billboards or adjusting a geometric transformation of the plurality of billboards. Also, the configuration of the plurality of billboards may be adjusted if the viewpoint is adjusted or the one or more volumetric elements are adjusted. The one or more volumetric elements may be adjusted by adjusting an amount of the one or more volumetric elements or adjusting a geometric transformation of the one or more volumetric elements.

In one configuration, a method or apparatus for graphics processing is provided. The apparatus may be a server, a client device, a GPU, a CPU, or some other processor that may perform graphics processing. In one aspect, the apparatus may be the processing unit 120 within the device 104, or may be some other hardware within device 104 or another device. The apparatus, e.g., processing unit 120, may include means for configuring a plurality of billboards associated with a viewpoint of a first frame of a plurality of frames, the plurality of billboards being configured in one or more layers at least partially around the viewpoint, the configuration of the plurality of billboards being based on one or more volumetric elements between at least one of the plurality of billboards and the viewpoint; means for rendering an image associated with each of the one or more volumetric elements between at least one billboard of the plurality of billboards and the viewpoint, the rendered image including a set of pixels; means for storing data in the at least one billboard of the plurality of billboards based on the rendered image associated with each of the one or more volumetric elements, the data corresponding to the set of pixels; means for mapping the data to the at least one billboard of the plurality of billboards based on the rendered image associated with each of the one or more volumetric elements; means for calculating a configuration for the mapping based on at least one of a geometric configuration of the one or more volumetric elements or a geometric configuration of the plurality of billboards; means for blending the at least one billboard of the plurality of billboards based on the data stored in the at least one billboard; means for generating the plurality of billboards associated with the viewpoint of the first frame, where the plurality of billboards is generated based on the configuration of the plurality of billboards; means for calculating an amount of the plurality of billboards associated with the viewpoint of the first frame; and means for adjusting the configuration of the plurality of billboards based on at least one of the viewpoint or the one or more volumetric elements.

The subject matter described herein may be implemented to realize one or more benefits or advantages. For instance, the described graphics processing techniques may be used by a server, a client, a GPU, a CPU, or some other processor that may perform graphics processing to implement the rendering techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize a rendering process that may configure billboards or layers for object-space rendering of volumetric effects.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various aspects and examples have been described. These and other aspects and examples are within the scope of the claims.

The following aspects are illustrative only and may be combined with other aspects or teachings described herein, without limitation.

Aspect 1 is an apparatus for graphics processing including at least one processor coupled to a memory and configured to: configure a plurality of billboards associated with a viewpoint of a first frame of a plurality of frames, the plurality of billboards being configured in one or more layers at least partially around the viewpoint, the configuration of the plurality of billboards being based on one or more volumetric elements between at least one of the plurality of billboards and the viewpoint; render an image associated with each of the one or more volumetric elements between at least one billboard of the plurality of billboards and the viewpoint, the rendered image including a set of pixels; store data in the at least one billboard of the plurality of billboards based on the rendered image associated with each of the one or more volumetric elements, the data corresponding to the set of pixels.

Aspect 2 is the apparatus of aspect 1, where the at least one processor is further configured to: map the data to the at least one billboard of the plurality of billboards based on the rendered image associated with each of the one or more volumetric elements.

Aspect 3 is the apparatus of any of aspects 1 and 2, where the at least one processor is further configured to: calculate a configuration for the mapping based on at least one of a geometric configuration of the one or more volumetric elements or a geometric configuration of the plurality of billboards.

Aspect 4 is the apparatus of any of aspects 1 to 3, where the mapping is a projective geometric mapping or a geometric projection.

Aspect 5 is the apparatus of any of aspects 1 to 4, where the at least one processor is further configured to: blend the at least one billboard of the plurality of billboards based on the data stored in the at least one billboard.

Aspect 6 is the apparatus of any of aspects 1 to 5, where the at least one billboard is blended based on one or more blending weights, and where the one or more blending weights are computed based on at least one of a transparency of the set of pixels or a depth of the set of pixels.

Aspect 7 is the apparatus of any of aspects 1 to 6, where the at least one processor is further configured to: generate the plurality of billboards associated with the viewpoint of the first frame, where the plurality of billboards is generated based on the configuration of the plurality of billboards.

Aspect 8 is the apparatus of any of aspects 1 to 7, where the one or more volumetric elements are associated with a first billboard of the plurality of billboards, where the first billboard is a billboard farthest from the viewpoint when an occluding object is between the one or more volumetric elements and the viewpoint.

Aspect 9 is the apparatus of any of aspects 1 to 8, where the one or more volumetric elements are associated with a second billboard of the plurality of billboards, where the second billboard is a billboard closest to the viewpoint.

Aspect 10 is the apparatus of any of aspects 1 to 9, where the configuration of the plurality of billboards is based on a portion of at least one billboard of the plurality of billboards overlapping with a portion of at least one other billboard of the plurality of billboards.

Aspect 11 is the apparatus of any of aspects 1 to 10, where each of the one or more layers is associated with a distance from the viewpoint.

Aspect 12 is the apparatus of any of aspects 1 to 11, where the distance from the viewpoint for each of the one or more layers is associated with the configuration of the billboards.

Aspect 13 is the apparatus of any of aspects 1 to 12, where the configuration of the billboards is associated with a configuration of the one or more volumetric elements.

Aspect 14 is the apparatus of any of aspects 1 to 13, where the at least one processor is further configured to: calculate an amount of the plurality of billboards associated with the viewpoint of the first frame.

Aspect 15 is the apparatus of any of aspects 1 to 14, where the amount of the plurality of billboards is calculated based on at least one of a resolution quality of the first frame, the one or more volumetric elements, a bandwidth of the rendered image, or a rendering time of the rendered image.

Aspect 16 is the apparatus of any of aspects 1 to 15, where the at least one processor is further configured to: adjust the configuration of the plurality of billboards based on at least one of the viewpoint or the one or more volumetric elements.

Aspect 17 is the apparatus of any of aspects 1 to 16, where the configuration of the plurality of billboards is adjusted by adjusting an amount of the plurality of billboards or adjusting a geometric transformation of the plurality of billboards.

Aspect 18 is the apparatus of any of aspects 1 to 17, where the configuration of the plurality of billboards is adjusted if the viewpoint is adjusted or the one or more volumetric elements are adjusted.

Aspect 19 is the apparatus of any of aspects 1 to 18, where the one or more volumetric elements are adjusted by adjusting an amount of the one or more volumetric elements or adjusting a geometric transformation of the one or more volumetric elements.

Aspect 20 is the apparatus of any of aspects 1 to 19, where the data is at least one of pixel data or texture data.

Aspect 21 is the apparatus of any of aspects 1 to 20, where the image is a semi-transparent image.

Aspect 22 is the apparatus of any of aspects 1 to 21, where the plurality of billboards is configured based on a viewpoint of at least one subsequent frame of the plurality of frames.

Aspect 23 is the apparatus of any of aspects 1 to 22, further including a transceiver coupled to the at least one processor.

Aspect 24 is a method of wireless communication for implementing any of aspects 1 to 23.

Aspect 25 is an apparatus for wireless communication including means for implementing any of aspects 1 to 23.

Aspect 26 is a computer-readable medium storing computer executable code, where the code when executed by a processor causes the processor to implement any of aspects 1 to 23.

What is claimed is:

1. An apparatus for graphics processing, comprising:
memory; and
at least one processor coupled to the memory and configured to:
configure a plurality of billboards in one or more layers at least partially around a viewpoint of a first frame of a plurality of frames, wherein the configuration of the plurality of billboards is based on one or more volumetric elements between at least one of the plurality of billboards and the viewpoint;
render an image associated with each of the one or more volumetric elements between a first billboard of the plurality of billboards and the viewpoint, wherein each of the one or more volumetric elements is between the first billboard and a second billboard of the plurality of billboards, wherein the second billboard is closer to the viewpoint compared to the first billboard, wherein each of the one or more volumetric elements is associated with the first billboard if an occluding object is between the volumetric element and the viewpoint, wherein each of the one or more volumetric elements is associated with the second billboard if the occluding object is not between the volumetric element and the viewpoint, and wherein the rendered image includes a set of pixels;
map data to at least one of the first billboard or the second billboard based on the rendered image associated with each of the one or more volumetric elements and a geometric configuration of the plurality of billboards; and
store the data in at least one of the first billboard or the second billboard based on the rendered image associated with each of the one or more volumetric elements, wherein the data corresponds to the set of pixels.

2. The apparatus of claim 1, wherein the at least one processor is further configured to:
calculate a configuration for the mapping based on at least one of a geometric configuration of the one or more volumetric elements or the geometric configuration of the plurality of billboards.

3. The apparatus of claim 1, wherein the mapping is a projective geometric mapping or a geometric projection.

4. The apparatus of claim 1, wherein the at least one processor is further configured to:
blend at least one of the first billboard or the second billboard based on the data stored in at least one of the first billboard or the second billboard.

5. The apparatus of claim 4, wherein to blend at least one of the first billboard or the second billboard, the at least one processor is configured to blend at least one of the first billboard or the second billboard based on one or more blending weights, and wherein the one or more blending weights are computed based on at least one of a transparency of the set of pixels or a depth of the set of pixels.

6. The apparatus of claim 1, wherein the at least one processor is further configured to:
generate the plurality of billboards associated with the viewpoint of the first frame based on the configuration of the plurality of billboards.

7. The apparatus of claim 1, wherein the one or more volumetric elements are associated with the first billboard of the plurality of billboards, wherein the first billboard is a billboard farthest from the viewpoint when an occluding object is between the one or more volumetric elements and the viewpoint.

8. The apparatus of claim 1, wherein the one or more volumetric elements are associated with the second billboard of the plurality of billboards, wherein the second billboard is a billboard closest to the viewpoint.

9. The apparatus of claim 1, wherein the configuration of the plurality of billboards is based on a portion of at least one of the first billboard or the second billboard overlapping with a portion of at least one other billboard of the plurality of billboards.

10. The apparatus of claim 1, wherein each of the one or more layers is associated with a distance from the viewpoint.

11. The apparatus of claim 10, wherein the distance from the viewpoint for each of the one or more layers is associated with the configuration of the billboards.

12. The apparatus of claim 10, wherein the configuration of the billboards is associated with a configuration of the one or more volumetric elements.

13. The apparatus of claim 1, wherein the at least one processor is further configured to:
calculate an amount of the plurality of billboards associated with the viewpoint of the first frame.

14. The apparatus of claim 13, wherein to calculate the amount of the plurality of billboards, the at least one processor is configured to calculate the amount of the plurality of billboards based on at least one of a resolution quality of the first frame, the one or more volumetric elements, a bandwidth of the rendered image, or a rendering time of the rendered image.

15. The apparatus of claim 1, wherein the at least one processor is further configured to:
adjust the configuration of the plurality of billboards based on at least one of the viewpoint or the one or more volumetric elements.

16. The apparatus of claim 15, wherein to adjust the configuration of the plurality of billboards, the at least one processor is configured to adjust an amount of the plurality of billboards or adjust a geometric transformation of the plurality of billboards.

17. The apparatus of claim 15, wherein the at least one processor is configured to adjust the configuration of the plurality of billboards if the viewpoint is configured to be adjusted or the one or more volumetric elements are configured to be adjusted.

18. The apparatus of claim 17, wherein to adjust the one or more volumetric elements, the at least one processor is configured to adjust an amount of the one or more volumetric elements or adjust a geometric transformation of the one or more volumetric elements.

19. The apparatus of claim 1, wherein the data is at least one of pixel data or texture data.

20. The apparatus of claim 1, further comprising a transceiver coupled to the at least one processor, wherein the image is a semi-transparent image.

21. The apparatus of claim 1, wherein to configure the plurality of billboards, the at least one processor is configured to configure the plurality of billboards based on a viewpoint of at least one subsequent frame of the plurality of frames.

22. A method of graphics processing, comprising:
configuring a plurality of billboards in one or more layers at least partially around a viewpoint of a first frame of a plurality of frames, wherein the configuration of the plurality of billboards is based on one or more volumetric elements between at least one of the plurality of billboards and the viewpoint;
rendering an image associated with each of the one or more volumetric elements between a first billboard of the plurality of billboards and the viewpoint, wherein each of the one or more volumetric elements is between the first billboard and a second billboard of the plurality of billboards, wherein the second billboard is closer to the viewpoint compared to the first billboard, wherein each of the one or more volumetric elements is associated with the first billboard if an occluding object is between the volumetric element and the viewpoint, wherein each of the one or more volumetric elements is associated with the second billboard if the occluding object is not between the volumetric element and the viewpoint, and wherein the rendered image includes a set of pixels;
mapping data to at least one of the first billboard or the second billboard based on the rendered image associated with each of the one or more volumetric elements and a geometric configuration of the plurality of billboards; and
storing the data in at least one of the first billboard or the second billboard based on the rendered image associated with each of the one or more volumetric elements, wherein the data corresponds to the set of pixels.

23. The method of claim 22, further comprising:
calculating a configuration for the mapping based on at least one of a geometric configuration of the one or more volumetric elements or the geometric configuration of the plurality of billboards.

24. The method of claim 22, further comprising:
blending at least one of the first billboard or the second billboard based on the data stored in at least one of the first billboard or the second billboard.

25. The method of claim 22, further comprising:
generating the plurality of billboards associated with the viewpoint of the first frame, wherein the plurality of billboards is generated based on the configuration of the plurality of billboards.

26. The method of claim 22, further comprising:
calculating an amount of the plurality of billboards associated with the viewpoint of the first frame, wherein the amount of the plurality of billboards is calculated based on at least one of a resolution quality of the first frame, the one or more volumetric elements, a bandwidth of the rendered image, or a rendering time of the rendered image.

27. The method of claim 22, further comprising:
adjusting the configuration of the plurality of billboards based on at least one of the viewpoint or the one or more volumetric elements.

28. An apparatus for graphics processing, comprising:
means for configuring a plurality of billboards in one or more layers at least partially around a viewpoint of a first frame of a plurality of frames, wherein the configuration of the plurality of billboards is based on one or more volumetric elements between at least one of the plurality of billboards and the viewpoint;
means for rendering an image associated with each of the one or more volumetric elements between a first billboard of the plurality of billboards and the viewpoint, wherein each of the one or more volumetric elements is between the first billboard and a second billboard of the plurality of billboards, wherein the second billboard is closer to the viewpoint compared to the first billboard, wherein each of the one or more volumetric elements is associated with the first billboard if an occluding object is between the volumetric element and the viewpoint, wherein each of the one or more volumetric elements is associated with the second billboard if the occluding object is not between the volumetric element and the viewpoint, and wherein the rendered image includes a set of pixels;

means for mapping data to at least one of the first billboard or the second billboard based on the rendered image associated with each of the one or more volumetric elements and a geometric configuration of the plurality of billboards; and means for storing the data in at least one of the first billboard or the second billboard based on the rendered image associated with each of the one or more volumetric elements, wherein the data corresponds to the set of pixels.

29. A non-transitory computer-readable medium storing computer executable code for graphics processing, the code when executed by a processor causes the processor to:

configure a plurality of billboards in one or more layers at least partially around a viewpoint of a first frame of a plurality of frames, wherein the configuration of the plurality of billboards is based on one or more volumetric elements between at least one of the plurality of billboards and the viewpoint;

render an image associated with each of the one or more volumetric elements between a first billboard of the plurality of billboards and the viewpoint, wherein each of the one or more volumetric elements is between the first billboard and a second billboard of the plurality of billboards, wherein the second billboard is closer to the viewpoint compared to the first billboard, wherein each of the one or more volumetric elements is associated with the first billboard if an occluding object is between the volumetric element and the viewpoint, wherein each of the one or more volumetric elements is associated with the second billboard if the occluding object is not between the volumetric element and the viewpoint, and wherein the rendered image includes a set of pixels;

map data to the at least one of the first billboard or the second billboard based on the rendered image associated with each of the one or more volumetric elements and a geometric configuration of the plurality of billboards; and store the data in the at least one of the first billboard or the second billboard based on the rendered image associated with each of the one or more volumetric elements, wherein the data corresponds to the set of pixels.

* * * * *